United States Patent
Ahn et al.

(10) Patent No.: US 6,219,330 B1
(45) Date of Patent: Apr. 17, 2001

(54) MASTER DISK FOR OPTICAL DISK AND HAVING FIRST AND SECOND PHOTORESIST LAYERS

(75) Inventors: Young-man Ahn, Suwon; Myung-do Ro, Kunpo; Chang-min Park, Suwon, all of (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/095,714

(22) Filed: Jun. 11, 1998

(30) Foreign Application Priority Data

Sep. 30, 1997 (KR) .................................. 97-50383

(51) Int. Cl.⁷ .................................................. G11B 7/24
(52) U.S. Cl. .................... 369/275.1; 369/275.4; 428/441; 428/64.4; 430/321
(58) Field of Search .................... 369/13, 275.1, 369/275.3, 275.4, 44.26, 109, 94; 428/441, 642, 644, 64.1, 64.3, 64.4; 430/321, 320, 270.1, 190

(56) References Cited

U.S. PATENT DOCUMENTS

| | | | |
|---|---|---|---|
| 5,339,304 | * | 8/1994 | Hanaoka .................. 369/109 |
| 5,432,047 | * | 7/1995 | Cheng et al. .............. 430/321 |
| 5,493,552 | * | 2/1996 | Kobori ..................... 369/109 |
| 5,540,966 | * | 7/1996 | Hintz ...................... 428/64.1 |
| 5,705,246 | * | 1/1998 | Katsuda ................... 428/64.1 |
| 5,853,953 | * | 12/1998 | George, Jr. .............. 430/270.1 |
| 5,876,823 | * | 3/1999 | Nagashima ............... 428/64.1 |

FOREIGN PATENT DOCUMENTS

| | | |
|---|---|---|
| 58-50638 | 3/1983 | (JP) . |
| 61-153850 | 7/1986 | (JP) . |
| 62-84450 | 4/1987 | (JP) . |
| 63-124246 | 5/1988 | (JP) . |
| 4-248146 | 9/1992 | (JP) . |
| 4-362549 | 12/1992 | (JP) . |
| 6-150397 | 5/1994 | (JP) . |

* cited by examiner

Primary Examiner—Ali Neyzari
(74) Attorney, Agent, or Firm—Staas & Halsey LLP

(57) ABSTRACT

A master disk used for manufacturing an optical disk on which information is recorded, and a method of manufacturing the same. First and second photoresist layers are sequentially disposed on a substrate and the first photoresist layer is less sensitive to exposure to a laser beam having a predetermined wavelength than the second photoresist layer. The master disk is manufactured by selectively exposing and etching the first and second photoresist layers, so that the boundaries between grooves and information pits recessed from the grooves become distinct and the grooves and information pits have inner walls substantially perpendicular to the substrate. Therefore, the reproduction characteristics of an optical disk obtained from the master disk are improved.

2 Claims, 4 Drawing Sheets

FIG. 1A
(PRIOR ART)
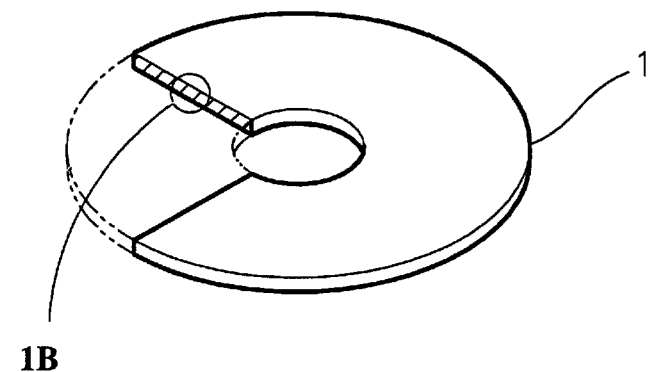
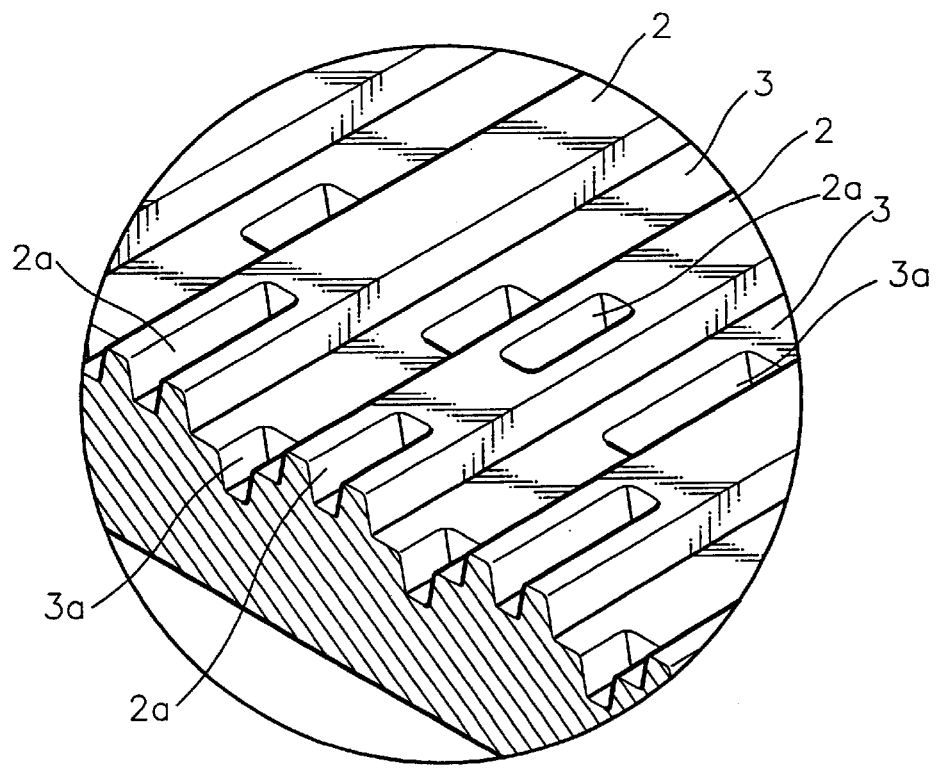
FIG. 1B
(PRIOR ART)

MASTER DISK FOR OPTICAL DISK AND HAVING FIRST AND SECOND PHOTORESIST LAYERS

BACKGROUND OF THE INVENTION

1. Field of the Invention

The present invention relates to a master disk used for manufacturing an optical disk on which information is recorded, and a method for manufacturing the same.

2. Description of the Related Art

An optical disk such as a compact disk (CD) or a digital versatile disk (DVD) used as a medium for recording and/or reproducing video information, as shown in FIGS. 1A and 1B, includes lands 2 each having information pits 2a, and grooves 3 positioned between neighboring lands 2 for defining the lands 2. Recently, much attention has been paid to increasing the capacity of recordable information by forming information pits 3a in the grooves 3 of an optical disk 1.

To manufacture the optical disk 1, a master disk having a recording plane of the same pattern as the optical disk 1 is generally necessary. In other words, as shown in FIG. 2, a master disk 10 having lands 31, grooves 33 and information pits 32 and 34, which is of the same pattern as the optical disk 1, is necessary. To manufacture the master disk 10, first, a photoresist capable of being photochemically reacted with a laser beam having a predetermined wavelength is coated on a carefully polished glass substrate 20 to a predetermined thickness, to form a photoresist layer 30. While the substrate 20 is rotated, two laser beams are simultaneously incident onto the substrate 20, so that the portions of the photoresist layer 30, where the grooves 33 and the information pits 32 and 34 are to be formed, are exposed to the laser beams. Then, a photochemical reaction occurs in the portions exposed to the laser beams. During the exposing process, one laser beam is deflected to the left and right to expose the portion in which the grooves 33 are to be formed, and the other laser beam exposes the portion where the information pits 32 and 34 are to be formed. Then, the exposed portions are etched and cleaned, thereby finally manufacturing the master disk 10 as shown in FIG. 2.

Thereafter, a metal film (not shown) is deposited thinly on the recording plane of the master disk 10 and a metal such as nickel is electrically coated on the metal film to then separate the coated film from the master disk 10. The coated film is used as a stamper in the plastic molding of the optical disk 1. Such a stamper has surface irregularities exactly opposite to those of the recording plane of the master disk 10. Accordingly, the optical disk manufactured by using the stamper has the lands, grooves and information pits having the same pattern as the master disk.

However, if the master disk is manufactured in the above-described manner, grooves and information pits are both formed in the same photoresist layer. Thus, the boundary between the grooves and information pits becomes ambiguous, and the angles of the side walls of the groove and information pits with respect to the substrate become lower. Therefore, in the optical disk manufactured using the master disk, the boundary between the groove and information pit becomes ambiguous and the side walls of the grooves and information pits have a low angle. As a result, it is difficult to reproduce the information recorded on the optical disk by a recording/reproducing apparatus, using light diffraction from the boundary between the groove and information pit. Accordingly, the reproduction characteristics of the optical disk are deteriorated. Such a problem becomes serious in a high-definition (HD)-DVD having information tracks at a smaller pitch than the conventional DVD.

SUMMARY OF THE INVENTION

To solve the above problems, it is an object of the present invention to provide an optical-disk master disk with an improved photoresist layer, by which the boundaries between grooves and information pits recessed from the grooves are distinctly defined.

It is another object of the present invention to provide a method of manufacturing an optical-disk master disk, by which the boundaries between grooves and information pits recessed from the grooves are distinctly defined.

Additional objects and advantages of the invention will be set forth in part in the description which follows and, in part, will be obvious from the description, or may be learned by practice of the invention.

Accordingly, to achieve the first object, there is provided an optical-disk master disk including a substrate; a first photoresist layer formed on the substrate and capable of photochemically reacting with a laser beam having a predetermined wavelength; a second photoresist layer formed on the first photoresist layer and capable of photochemically reacting with the same laser beam more sensitively than the first photoresist layer; a plurality of first information pits formed in the second photoresist layer; and a plurality of second information pits formed in the first photoresist layer.

To achieve the second object, there is provided a method of manufacturing an optical-disk master disk including the steps of forming, on a substrate, a first photoresist layer capable of photochemically reacting with a laser beam having a predetermined wavelength; forming, on the first photoresist layer, a second photoresist layer capable of photochemically reacting with the same laser beam more sensitively than the first photoresist layer; providing first and second laser beams having the predetermined wavelength; exposing a predetermined portion of the second photoresist layer to the second laser beam; and exposing a predetermined portion of the first photoresist layer, which is under the exposed portion of the second photoresist layer, to the first laser beam.

BRIEF DESCRIPTION OF THE DRAWINGS

The above and other objects and advantages of the present invention will become more apparent by describing in detail a preferred embodiment thereof with reference to the attached drawings in which:

FIG. 1A is a perspective view illustrating an optical disk produced from both a conventional master disk and from a master disk according to an embodiment of the present invention;

FIG. 1B is an enlarged view of important parts of the optical disk shown in FIG. 1A.

DESCRIPTION OF THE PREFERRED EMBODIMENT

Figure 2:
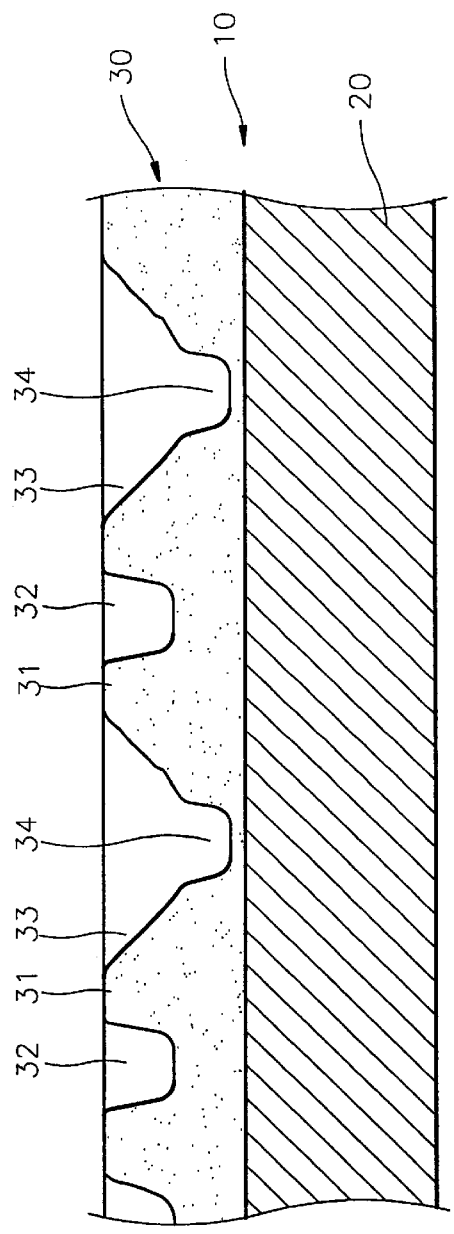
FIG. 2 is a vertical section view of the conventional master disk for manufacturing the optical disk shown in FIG. 1.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
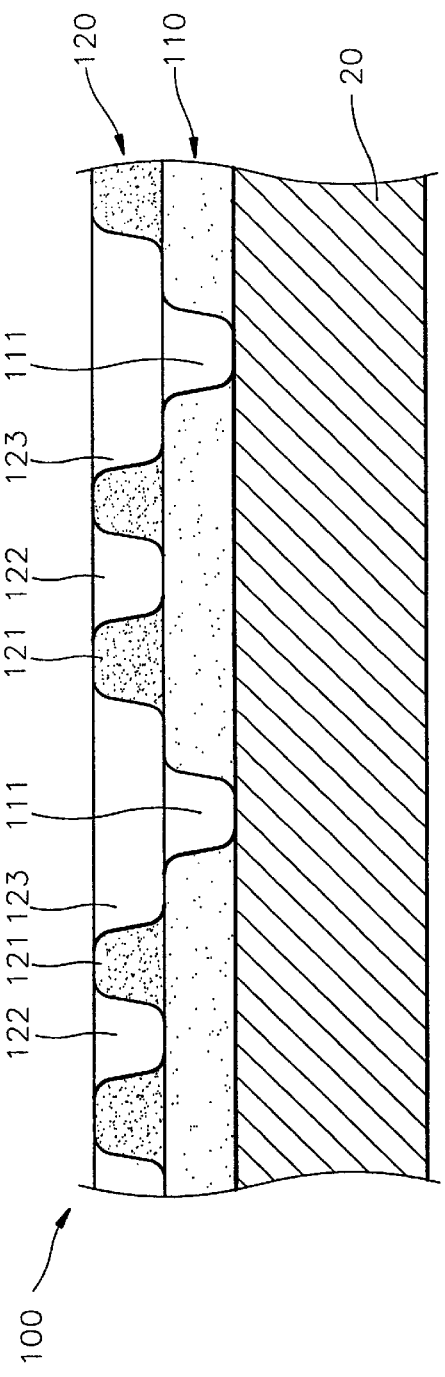
FIG. 3 is a vertical cross-sectional view of a master disk for manufacturing the optical disk according to the embodiment of the present invention.

Referring to FIG. 3, a master disk 100 according to an embodiment of the present invention includes a glass substrate 20, a first photoresist layer 110 formed on the substrate 20, and a second photoresist layer 120 formed on the first photoresist layer 110. The first photoresist layer 110 is formed of a first photoresist capable of being photochemically reacting with a laser beam having a predetermined wavelength, and the second photoresist layer 120 is formed of a second photoresist capable of being photochemically reacting with the same laser beam more sensitively than the first photoresist layer 110.

For example, in the case when the photoresist layers are to be exposed using a laser beam having a wavelength in the range of 350~430 nm, for example, DNQ-4 (1-oxo-2-diazonaphthoquinone-4-arylsulfonate) capable of being photochemically reacting with a laser beam having a wavelength of 310~390 nm, may be used as the first photoresist, and DNQ-5 (1-oxo-2-diazonaphthoquinone-5-arylsulfonate) capable of photochemically reacting with a laser beam having a wavelength of 350~430 nm, may be used as the second photoresist, thereby forming the first and second photoresist layers 110 and 120. Then, the second photoresist layer 120 photochemically reacts with the laser beam more sensitively than the first photoresist layer 110. Thus, the first photoresist layer 110 is sensitive to a laser beam having a wavelength in the range of 310~390 nm, and "less sensitive" to a laser beam having a wavelength outside the range of 310~390 nm. The second photoresist layer 120 is sensitive to the laser beam having a wavelength of 350~430 nm, and "less sensitive" to the laser beam having the wavelength outside the range of 350~430 nm. When, as described above, DNQ-4 and DNQ-5 are used as the first and second photoresists, the laser beam preferably has a wavelength in the range of 400~430 nm, and more preferably 413 nm.

The lands 121 are formed in the second photoresist layer 120, and first information pits 122 recessed from the surface of the lands 121 are formed in the lands 121. Also, grooves 123 are formed in the second photoresist layer 120, each groove 123 being positioned between neighboring lands 121. Second information pits 111 recessed from the bottom surface of the grooves 123 are formed in the first photoresist layer 110.

In the master disk 100 having the aforementioned structure, photoresist layers 110 and 120 having different photochemical reactivities from each other are formed on the substrate 20. The grooves 123 and second information pits 111 are formed in different photoresist layers, respectively. Therefore, unlike in the conventional master disk of FIG. 2, in the master disk according to the present invention, the boundary between the grooves 123 and the second information pits 111 is more distinctly defined, and the respective second information pits 111 have inner walls substantially perpendicular with respect to the substrate 20.

If the optical disk 1 (FIG. 1) is manufactured by the above-described master disk 100, the boundary between the grooves 3 (FIG. 1) and the second information pits 3a (FIG. 1) is more distinctly defined in the optical disk 1. Likewise, the respective second information pits 3a have inner walls substantially perpendicular to each bottom surface of the second information pits 3a. Therefore, when reproducing the information recorded on the optical disk, the second information pits 3a can be clearly detected by an optical pickup incorporated in the recording/reproducing apparatus, thereby improving reproduction characteristics.

In the course of manufacturing the master disk 100, an example of the procedure for forming the grooves 123 and the second information pits 111 will be described in detail with reference to FIGS. 4 through 6.

Figure 4:
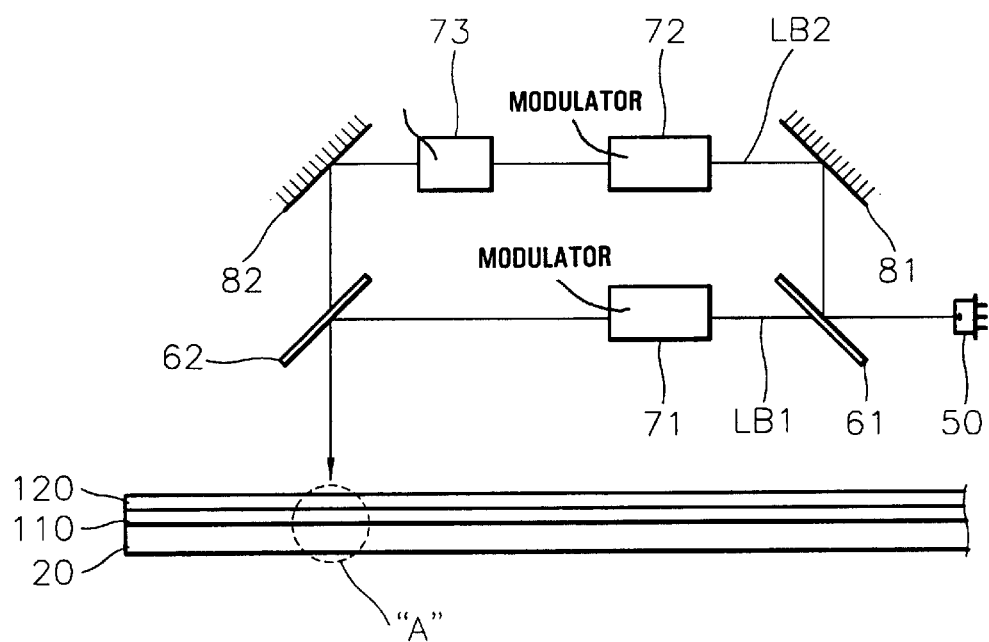
FIGS. 4 through 6 illustrate a method of manufacturing the master disk shown in FIG. 3.

First, as shown in FIG. 4, the first photoresist is coated on the carefully polished glass substrate 20 to form a first photoresist layer 110. Then, the second photoresist is coated on the first photoresist layer 110 to form a second photoresist layer 120. The substrate 20 is placed at a position where a first laser beam LB1 and a second laser beam LB2 having the same wavelength, e.g., 415 nm, can be incident onto the substrate 20 at a region "A" from the upper side of the second photoresist layer 120.

The first photoresist layer 110 is "less sensitive" to a laser beam having a wavelength of 415 nm than the second photoresist layer 120. The longer the exposure time with respect to a portion of either photoresist layer, the deeper the exposure depth of the portion becomes.

In this embodiment, the first laser beam LB1 and the second laser beam LB2 are generated by the laser diode 50. In other words, the laser beam emitted from the laser diode 50 is split by a beam splitter 61 to then be separated into the first laser beam LB1 and the second laser beam LB2. Modulators 71 and 72 to selectively block the respective laser beams LB1 and LB2 are installed along the respective optical paths of the first and second laser beams LB1 and LB2. A deflector 73 to deflect the second laser beam LB2 is installed along the optical path of the second laser beam LB2. Reference numeral 62 denotes a beam splitter, and reference numerals 81 and 82 denote mirrors.

In such a state as shown in FIG. 4, the substrate 20 is rotated, and simultaneously the first and second laser beams LB1 and LB2 are incident onto the substrate 20 to expose desired portions thereof. In other words, the portions where the grooves 123, the first information pits 122 and the second information pits 111 recessed from the grooves 123 are to be formed, are exposed. Then, the photochemical reactions occur in the exposed portions. While exposing the portions where the grooves 123 are to be formed, as shown in FIG. 5, the second laser beam LB2 is repeatedly deflected by the deflector 73 across the width of the groove 123, that is, repeatedly deflected in two (both) sides around the optical axis of the first laser beam LB1, along the direction of the radius of the substrate 20. In such a manner, the exposing time of the portion exposed by the second laser beam LB2 becomes shorter. Thus, the first photoresist layer 110 insensitive to the laser beam LB2 is not exposed but the second photoresist layer 120 sensitive thereto is exposed. By doing so, in the course of exposing the portion where the grooves 123 are to be formed, the first laser beam LB1 is made to be incident onto the substrate 20 through the modulator 71 in the portion where the second information pits 111 are to be formed. In such a manner, the first laser beam LB1 is incident onto the portion of the second photoresist layer 120 photochemically reacted with the second laser beam LB2. In this case, the first laser beam LB1 is incident without being deflected, unlike in the case when the exposure is performed with the second laser beam LB2 being deflected in the two sides of the optical axis of the first laser beam LB1. Thus, the exposure time of the to-be-exposed portion becomes longer than that of the portion where the grooves 123 are to be formed. Therefore, the portion of the first photoresist layer 110, where the second information pits 111 are to be formed, as well as the second photoresist layer 120 are exposed by the first laser beam LB1. Thus, the boundary between the exposed portion of the first photoresist layer 110 and the exposed portion of the second photoresist layer 120 becomes distinctly defined. Also, the exposed portion of the second photoresist layer 120 has a substantially rectangular section.

Figure 5:
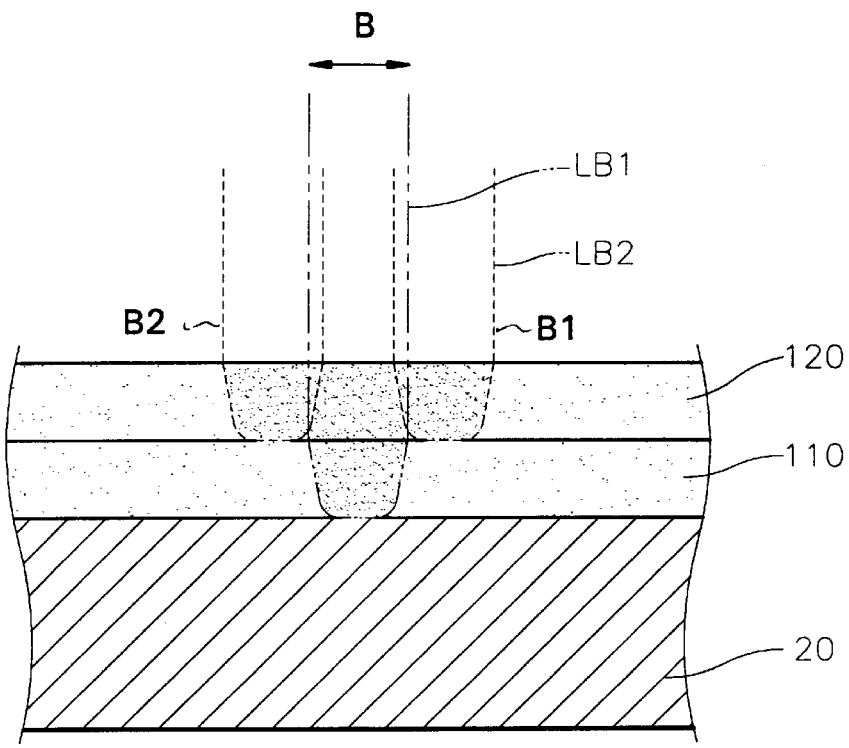

Although not shown in FIG. 5, the portion where the first information pits 122 are to be formed is exposed by the first laser beam LB1 or the second laser beam LB2 without being deflected. In this case, since the first information pits 122 are formed in the second photoresist layer 120 having a high sensitivity, the exposure time can be shortened. As described above, when the portions where the grooves 123 and the first information pits 122 are to be formed are exposed, portions where the lands 121 are to be formed between the neighboring portions where the grooves 123 are to be formed, and the portions where the first information pits 122 are to be formed, are contained in the portions where the lands 121 are to be formed.

Since the portions where the grooves 123 are to be formed (hereinafter "the second portions") are exposed to the second laser beam LB2 which is repeatedly deflected between the positions "B1" and "B2" along the direction indicated by the arrow B as shown in FIG. 5, the second portions are widely and shallowly exposed. If the exposure time is long, the second photoresist layer 120 may be exposed to the second laser beam LB2 and photochemically reacts with the second laser beam LB2, but the exposure time is predetermined so that the first photoresist layer 110 is not exposed to the second laser beam LB2 which is being deflected. However, since the portions where the second information pits 111 are to be formed (hereinafter "the first portions") are exposed to the first laser beam LB1 which is not deflected, the first portions are more narrowly and deeply exposed than the second portions during the predetermined time. Accordingly, the first photoresist layer 110, although less sensitive than the second photoresist layer, can be exposed to the first laser beam LB1 and can photochemically react with the first laser beam LB1.

Figure 6:
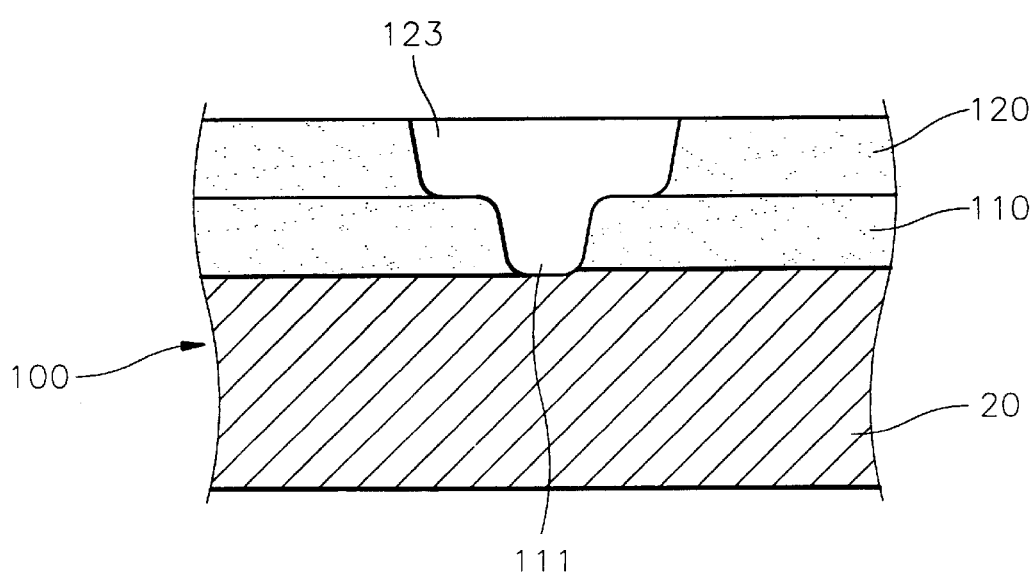

After completing the exposure procedure, the exposed portions are etched and cleaned to complete the master disk 100 shown in FIGS. 3 or 6.

In the master disk 100, as described above, the boundary between the exposed portions where the grooves 123 and the second information pits 111 is more distinctly defined, and the exposed portions have a substantially rectangular section. Therefore, the grooves 123 and second information pits 111 are distinctly defined in the boundary therebetween, and the inner walls of the grooves 123 and second information pits 111 slope sharply with respect to the substrate 20 so that they are substantially perpendicular to each other.

Although it has been described that the first laser beam LB1 and the second laser beam LB2 are generated by the laser diode 50, it is also possible that the first laser beam LB1 and the second laser beam LB2 having the same wavelength are generated by two different laser diodes.

The present invention has been particularly shown and described with reference to a preferred embodiment thereof, but various other changes in form and details may be embodied without departing from the spirit and scope of the invention.

As described above, according to the present invention, a first photoresist layer less sensitive to exposure to a laser beam of a predetermined wavelength and a second photoresist layer more sensitive to the laser beam than the first photoresist layer are sequentially disposed on a substrate. A master disk can be manufactured by selectively exposing and etching the photoresist layers, so that the boundary between the grooves and the second information pits recessed from the grooves becomes distinct, and the grooves and second information pits have inner walls substantially perpendicular to the substrate. Therefore, the reproduction characteristics of an optical disk obtained by the master disk are improved.

What is claimed is:

1. An optical-disk master disk, comprising:

a substrate;

a first photoresist layer formed on said substrate, said first photoresist layer made of 1-oxo-2-diazonaphthoquinone-4-arylsulfonate;

a second photoresist layer formed on said first photoresist layer, said second photoresist layer made of 1-oxo-2-diazonaphthoquinone-5-arylsulfonate and having a greater sensitivity to a laser beam of a predetermined wavelength than that of said first photoresist layer;

a plurality of first information pits formed in said second photoresist layer; and a plurality of second information pits formed in said first photoresist layer.

2. An optical-disk master, comprising:

a substrate;

a first photoresist layer formed on said substrate, wherein said first photoresist layer is made of 1-oxo-2-diazonaphthoquinone-4-arylsulfonate;

a second photoresist layer formed on said first photoresist layer, said second photoresist layer having a greater sensitivity to a laser beam of a predetermined wavelength than that of said first photoresist layer, wherein said second photoresist layer is made of 1-oxo-2-diazonaphthoquinone-5-arylsulfonate;

grooves formed in said second photoresist layer;

lands formed of said second photoresist layer and between said grooves;

a plurality of first information pits formed in said lands; and a plurality of second information pits formed in said grooves.

* * * * *